United States Patent
Taherzadeh Boroujeni et al.

(10) Patent No.: US 12,167,465 B2
(45) Date of Patent: Dec. 10, 2024

(54) RANDOM ACCESS IN A NON-TERRESTRIAL NETWORK

(71) Applicant: INTERDIGITAL PATENT HOLDINGS, INC., Wilmington, DE (US)

(72) Inventors: Mahmoud Taherzadeh Boroujeni, San Diego, CA (US); Shahrokh Nayeb Nazar, San Diego, CA (US); Ahmad Reza Hedayat, Aliso Viejo, CA (US); Seyed Mohsen Hosseinian, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/751,290

(22) Filed: May 23, 2022

(65) Prior Publication Data

US 2022/0369374 A1 Nov. 17, 2022

Related U.S. Application Data

(63) Continuation of application No. 16/970,239, filed as application No. PCT/US2019/017994 on Feb. 14, 2019, now Pat. No. 11,343,857.

(Continued)

(51) Int. Cl.
*H04W 74/0833* (2024.01)
*H04W 48/10* (2009.01)
(Continued)

(52) U.S. Cl.
CPC ....... *H04W 74/0833* (2013.01); *H04W 48/10* (2013.01); *H04W 56/005* (2013.01); *H04W 74/004* (2013.01); *H04W 84/06* (2013.01)

(58) Field of Classification Search
CPC ............. H04W 74/0833; H04W 48/10; H04W 56/005; H04W 74/004; H04W 84/06;
(Continued)

(56) References Cited

U.S. PATENT DOCUMENTS

| 8,111,656 B2 | 2/2012 | Che et al. |
| 2006/0280199 A1 | 12/2006 | Lane et al. |

(Continued)

FOREIGN PATENT DOCUMENTS

| WO | 2015/013073 | 1/2015 |
| WO | 2015/119568 | 8/2015 |

OTHER PUBLICATIONS

IEEE Standard for Information technology—Telecommunications and information exchange between systems Local—and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Ashley Shivers
(74) *Attorney, Agent, or Firm* — Volpe Koenig

(57) ABSTRACT

Methods and apparatus for adjusting a random access response window in a non-terrestrial network are provided. A method comprises receiving information that includes a gNodeB type parameter and a random access response window length parameter. The method further comprises determining that a gNodeB is a non-terrestrial gNodeB. The method further comprises determining a minimum round trip time (RTT). The method further comprises determining a time offset for a random access response window. The method further comprises determining a length of the random access response window based on the received random access response window length parameter and a non-terrestrial network based table. The method further comprises (Continued)

setting the random access response window based on the time offset. The method further comprises monitoring a downlink control channel on monitoring occasions within the random access response window.

20 Claims, 11 Drawing Sheets

Related U.S. Application Data

(60) Provisional application No. 62/630,578, filed on Feb. 14, 2018.

(51) Int. Cl.
*H04W 56/00* (2009.01)
*H04W 74/00* (2009.01)
*H04W 84/06* (2009.01)

(58) Field of Classification Search
CPC  H04W 74/002; H04W 48/12; H04B 7/18539; H04B 7/18504; H04B 7/18513
See application file for complete search history.

(56) References Cited

U.S. PATENT DOCUMENTS

| | | | |
|---|---|---|---|
| 2010/0113051 | A1 | 5/2010 | Du et al. |
| 2013/0114515 | A1 | 5/2013 | Koo et al. |
| 2014/0112254 | A1 | 4/2014 | Lindoff et al. |
| 2014/0274114 | A1 | 9/2014 | Rowitch |
| 2014/0278077 | A1* | 9/2014 | Levin .................. G01S 19/06 701/469 |
| 2019/0029049 | A1 | 1/2019 | Akkarakaran et al. |
| 2019/0200391 | A1 | 6/2019 | Li et al. |
| 2019/0215220 | A1 | 7/2019 | Islam et al. |
| 2021/0282189 | A1 | 9/2021 | Irukulapati et al. |

OTHER PUBLICATIONS

IEEE Standard for Information technology—Telecommunications and information exchange between systems Local—and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Considerations on Random Access for Non-Terrestrial Networks," 3GPP TSG RAN WG1 Meeting #92, R1-1802632, Athens, Greece (Feb. 26-Mar. 2, 2018).
Third Generation Partnership Project, "Technical Specification Group Radio Access Network; NR; Physical channels and modulation (Release 15)," 3GPP TS 38.211 V15.0.0 (Dec. 2017).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; Solutions for NR to support non-terrestrial networks (NTN) (Release 16)," 3GPP TR 38.821 V0.3.0 (Nov. 2018).
Third Generation Partnership Project, "Technical Specification Group Radio Access Network; Study on New Radio (NR) to support non terrestrial networks (Release 15)," 3GPP TR 38.811 V15.0.0 (Jun. 2018).
Third Generation Partnership Project, "Technical Specification Group Radio Access Network; Study on New Radio (NR) to support non terrestrial networks (Release 15)," 3GPP TR 38.811 V0.3.0 (Dec. 2017).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Medium Access Control (MAC) protocol specification (Release 15)," 3GPP TS 38.321 V15.0.0 (Dec. 2017).
Third Generation Partnership Project, "Technical Specification Group Radio Access Network; NR; Physical channels and modulation (Release 15)," 3GPP TS 38.211 V15.4.0 (Dec. 2018).
Third Generation Partnership Project, "Technical Specification Group Radio Access Network; NR; Physical layer procedures for control (Release 15)," 3GPP TS 38.213 V15.4.0 (Dec. 2018).
Wang et al., "A PAR-DQ Random Access Preamble Detection Algorithm in LTE-Satellite Communication System," Sixth International Conference on Wireless Communications and Signal Processing, pp. 1-5 (Oct. 2014).
Ericsson, "Random Access in NR," 3GPP TSG-RAN WG2 #98, R2-1704403, Hangzhou, P.R. of China (May 15-19, 2017).
Dish Network et al., "Satellite Aspects—Forward Compatibility Consideration for Random Access Preamble Format," 3GPP TSG RAN WG1 Meeting NR AH, R1-1700700, Spokane, WA (Jan. 16-20, 2017).

* cited by examiner

RANDOM ACCESS IN A NON-TERRESTRIAL NETWORK

CROSS-REFERENCE TO RELATED APPLICATIONS

This application is a continuation of U.S. patent application Ser. No. 16/970,239, filed Feb. 14, 2019, issued as U.S. Pat. No. 11,343,857 on May 24, 2022, which is a U.S. National Stage under 35 U.S.C. § 371, of International Application No. PCT/US2019/017994, filed Feb. 14, 2019, which claims the benefit of U.S. Provisional Application No. 62/630,578, filed Feb. 14, 2018, the content of which is hereby incorporated by reference herein.

BACKGROUND

One of the aspects of 5G NR is the physical random access channel (PRACH) and the random access procedure (RACH procedure). In the RACH procedure, which is designed for uplink time synchronization, a wireless transmit/receive unit (WTRU) transmits a PRACH preamble. The WTRU attempts to detect a response to the PRACH preamble during a time window. This procedure is not particularly adapted for non-terrestrial communications.

SUMMARY

Systems, methods, and devices for random access to a communications network by a WTRU. In some implementations, the WTRU receives random access response (RAR) configuration information. The WTRU determines a time offset for a RAR window, based on a minimum round trip time (RTT) between the WTRU and a non-terrestrial network device. The WTRU determines a length of the RAR window. The WTRU transmits a PRACH preamble to the non-terrestrial network device. The WTRU monitors a physical downlink control channel (PDCCH) from the non-terrestrial network device during the RAR window based on the time offset and the length of the RAR window.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
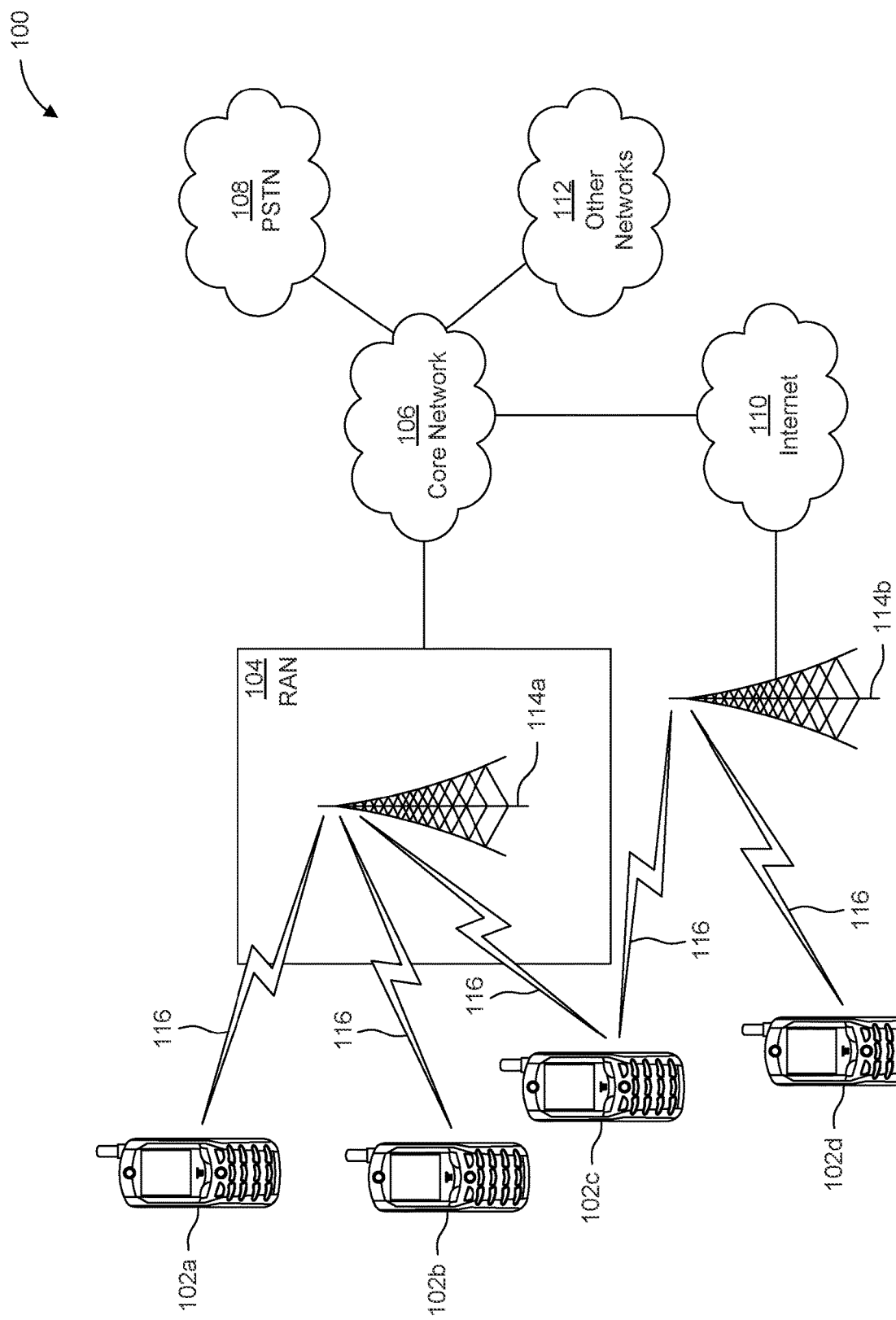
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
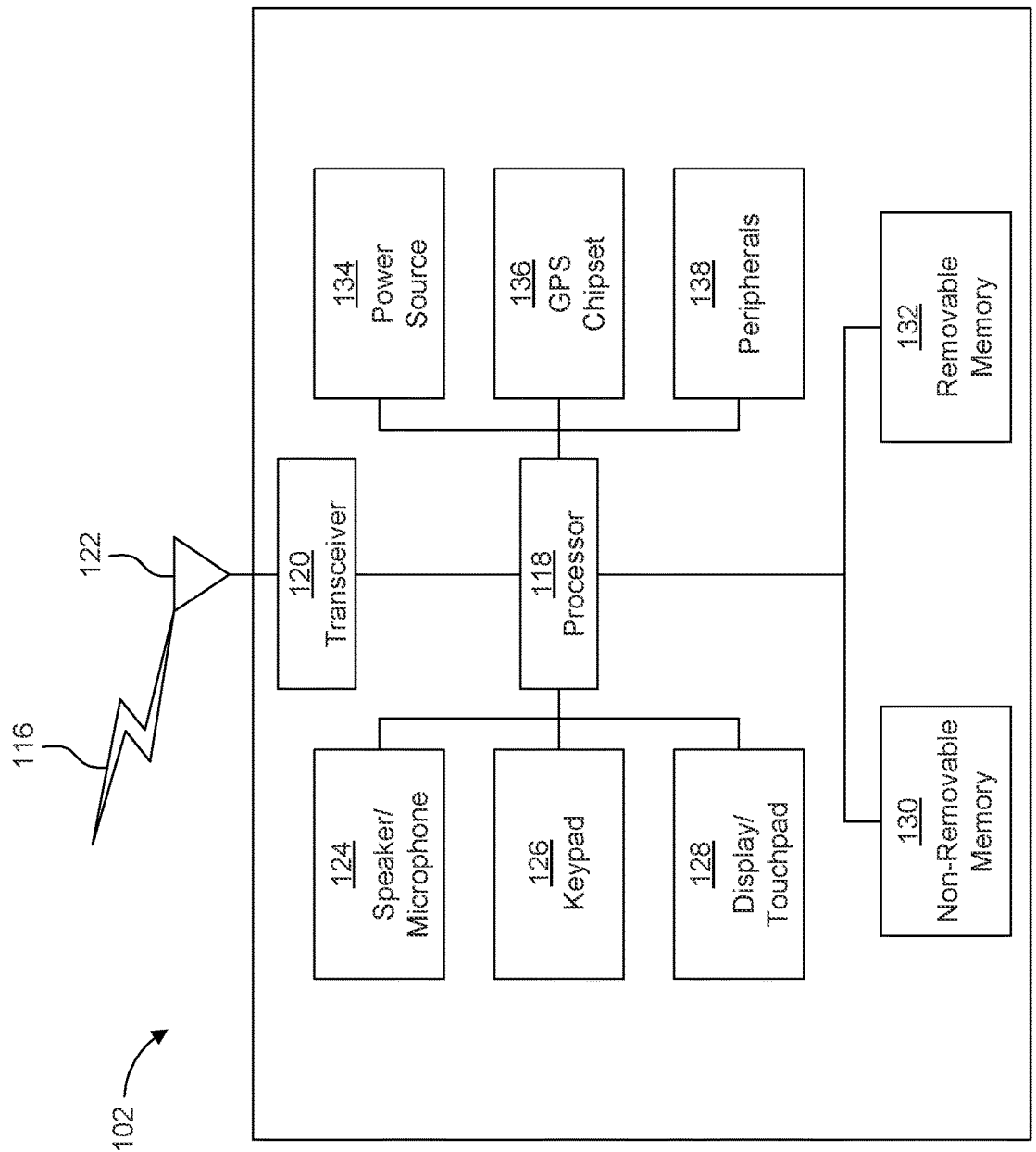
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
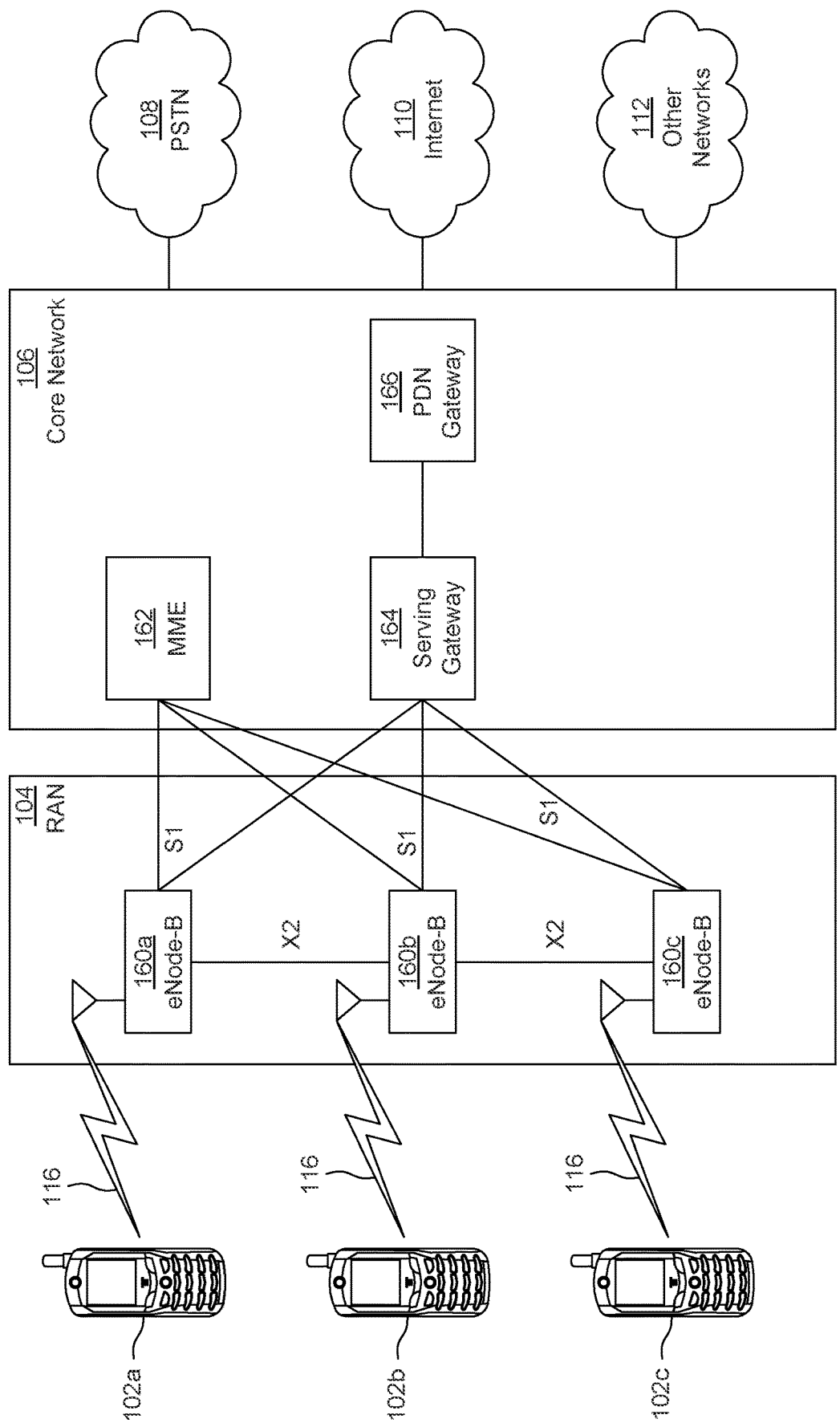
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
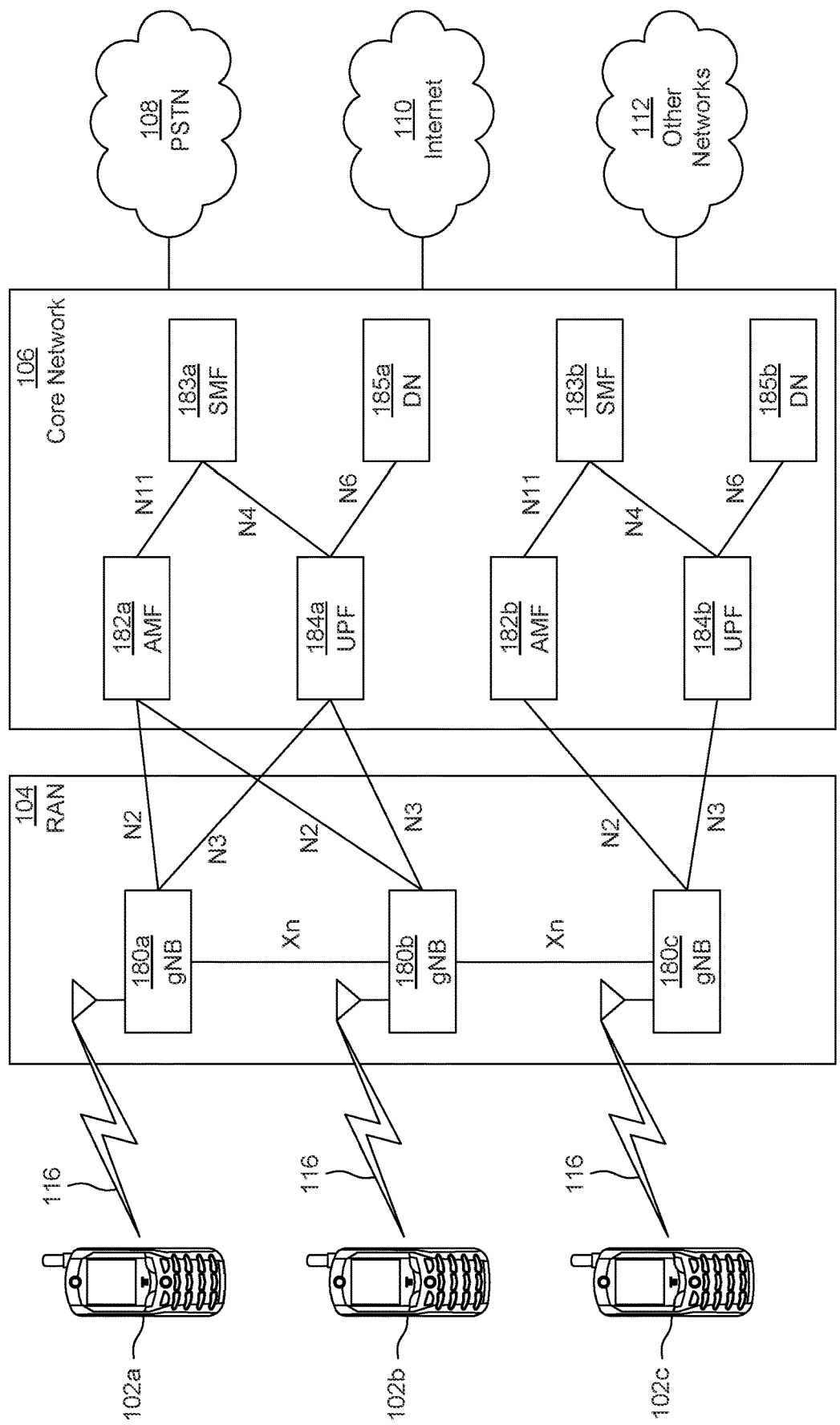
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Some embodiments include methods and apparatus for adjusting a random access response window in a non-terrestrial network. In an embodiment, a method comprises receiving information that includes a gNodeB type parameter and a random access response window length parameter. The method further comprises determining that a gNodeB is a non-terrestrial gNodeB. The method further comprises determining a minimum round trip time (RTT). The method further comprises determining a time offset for a random access response window. The method further comprises determining a length of the random access response window based on the received random access response window length parameter and a non-terrestrial network based table. The method further comprises setting the random access response window based on the time offset. The method further comprises monitoring a downlink control channel on monitoring occasions within the random access response window.

Some implementations include systems, methods, and devices for random access to a communications network by a wireless transmit/receive unit (WTRU). In some implementations, the WTRU receives random access response (RAR) configuration information. The WTRU determines a time offset for a RAR window, based on a minimum round trip time (RTT) between the WTRU and a non-terrestrial network device. The WTRU determines a length of the RAR window. the WTRU monitors a physical downlink control channel (PDCCH) from the non-terrestrial network device during the RAR window based on the time offset and the length of the RAR window.

Some embodiments apply 3GPP 5G New Radio (NR) techniques to satellite communications or other non-terrestrial networks. Some aspects of NR include a physical random access channel (PRACH) and a random access (RACH) procedure. A RACH procedure may be used for uplink time synchronization. In a RACH procedure a WTRU may transmit a PRACH preamble. After transmitting the PRACH preamble, a WTRU may attempt to detect a physical downlink control channel (PDCCH) with a corresponding random access-radio network temporary identifier (RA-RNTI) during a window controlled by higher layers (e.g. "ra-ResponseWindow"). The window may start at the first symbol of the earliest control resource set where the WTRU is configured for a Type1-PDCCH common search space, that may be a certain number of symbols (e.g., as defined in a standard or otherwise) after the last symbol of the preamble sequence transmission. The length of the window, in number of slots, may be based on a sub-carrier spacing and cyclic prefix for a Type0-PDCCH common search space. This length may be provided by a higher layer parameter, which may be, e.g., a "rar-WindowLength" parameter.

The PRACH preamble may include a prime-length Zadoff-Chu (ZC) sequence that may provide good auto-correlation properties, with respect to its cyclic shifts, which may be needed for time synchronization. For a certain length, different ZC sequences may be obtained using different roots. The different ZC sequences may have good cross-correlation properties, e.g., such that can be used for distinguishing WTRUs.

PRACH preambles may have several formats, each with a different length, cyclic prefix (CP), and guard time (GT). A PRACH format may be identified from a PRACH configuration index, which may be transmitted by a gNodeB via higher layer signaling through a system information block (SIB) (e.g., SIB2). In NR, four PRACH formats are associated with a preamble sequence length of 839, and additional formats are introduced for preamble sequence length of 139, as shown in the following tables from 3GPP TS 38.211 V15.0.0. In the tables below, the variables are defined as per TS 38.211 V15.0.0. For example, the variable $L_{RA}$ refers to a length of a random access preamble, the variable $\Delta f^{RA}$ refers to a subcarrier spacing for random access preambles, the variable $N_u$ refers to a sequence length for preamble formats, the variable u refers to a sequence number, the variable $N_{CP}^{RA}$ refers a cyclic prefix length, the variable $\kappa$ refers to a ratio $(T_s/T_c)$ between a basic time unit $T_s$ for LTE and a basic time unit $T_c$ for NR, and the variable $\mu$ refers to a subcarrier spacing configuration.

Table 1 shows example PRACH preamble formats for $L_{RA}$=839 and $\Delta f^{RA} \in \{1.25,5\}$kHz:

TABLE 1

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576 $\kappa$ | 3168 $\kappa$ | Type A, Type B |
| 1 | 839 | 1.25 kHz | 2 · 24576 $\kappa$ | 21024 $\kappa$ | Type A, Type B |
| 2 | 839 | 1.25 kHz | 4 · 24576 $\kappa$ | 4688 $\kappa$ | Type A, Type B |
| 3 | 839 | 5 kHz | 4 · 6144 $\kappa$ | 3168 $\kappa$ | Type A, Type B |

Table 2 shows example preamble formats for $L_{RA}$=139 and $\Delta f^{RA}$=15·$2^\mu$ kHz where $\mu \in \{0,1,2,3\}$:

TABLE 2

| Format | $L_{RA}$ | $\Delta f^{RA}$ | $N_u$ | $N_{CP}^{RA}$ | Support for restricted sets |
|---|---|---|---|---|---|
| A1 | 139 | 15 · $2^\mu$ kHz | 2 · 2048 $\kappa$ · $2^{-\mu}$ | 288 $\kappa$ · $2^{-\mu}$ | — |
| A2 | 139 | 15 · $2^\mu$ kHz | 4 · 2048 $\kappa$ · $2^{-\mu}$ | 576 $\kappa$ · $2^{-\mu}$ | — |
| A3 | 139 | 15 · $2^\mu$ kHz | 6 · 2048 $\kappa$ · $2^{-\mu}$ | 864 $\kappa$ · $2^{-\mu}$ | — |
| B1 | 139 | 15 · $2^\mu$ kHz | 2 · 2048 $\kappa$ · $2^{-\mu}$ | 216 $\kappa$ · $2^{-\mu}$ | — |
| B2 | 139 | 15 · $2^\mu$ kHz | 4 · 2048 $\kappa$ · $2^{-\mu}$ | 360 $\kappa$ · $2^{-\mu}$ | — |
| B3 | 139 | 15 · $2^\mu$ kHz | 6 · 2048 $\kappa$ · $2^{-\mu}$ | 504 $\kappa$ · $2^{-\mu}$ | — |

TABLE 2-continued

| Format | $L_{RA}$ | $\Delta f^{RA}$ | $N_u$ | $N_{CP}^{RA}$ | Support for restricted sets |
|---|---|---|---|---|---|
| B4 | 139 | 15 · $2^\mu$ kHz | 12 · 2048 $\kappa$ · $2^{-\mu}$ | 936 $\kappa$ · $2^{-\mu}$ | — |
| C0 | 139 | 15 · $2^\mu$ kHz | 2048 $\kappa$ · $2^{-\mu}$ | 1240 $\kappa$ · $2^{-\mu}$ | — |
| C2 | 139 | 15 · $2^\mu$ kHz | 4 · 2048 $\kappa$ · $2^{-\mu}$ | 2048 $\kappa$ · $2^{-\mu}$ | — |

For a non-terrestrial gNodeB, a round-trip time (RTT) to a WTRU may be much larger than a RTT in a terrestrial network. RTT may be estimated as, or based on, the distance between a gNodeB and a WTRU, divided by the speed of the light. The distance between a gNodeB and a WTRU may be estimated by the distance of the non-terrestrial gNodeB from Earth and the angle of elevation. A non-terrestrial gNodeB, may estimate the maximum and the minimum distance to a WTRU and the maximum and the minimum RTT based on its distance from Earth and the footprint of its beam on Earth. In such cases, a maximum RTT and a range of variation of RTT may be different, unlike in a terrestrial cellular network. For example, for a geostationary (GEO) satellite, the maximum round-trip time may be as high as 600 ms, whereas the variation of the RTT, which is dependent on the footprint, may be much smaller. Assuming, for example, a minimum elevation angle of 40 degrees, the maximum variation of RTT may be estimated as shown in Table 3.

TABLE 3

| Spot beam size (in Km) | Maximum variation of the round-trip time (in ms) |
|---|---|
| 150 | 1.44 |
| 200 | 1.92 |
| 300 | 2.88 |
| 500 | 4.80 |

In non-terrestrial communications, larger delays and RTTs (as compared with terrestrial applications) may require a new design for various aspects of NR, including PRACH design and RACH procedure.

An appropriate window length of a response to a PRACH preamble transmission may be needed to be compatible with non-terrestrial communication needs, e.g., including a large RTT. For non-terrestrial networks, the RTT may be much larger than the RTT in terrestrial networks. For example, in some cases, RTT may be up to 600 milliseconds for a GEO satellite with a bent pipe architecture. In some cases, the current window for the PRACH response in NR, which starts at a certain number of symbols (e.g., as defined in a standard or otherwise) after transmitting the last symbol of the preamble, and has the size of "rar-WindowLength", which is limited by 10 ms, cannot cover the RTT for all non-terrestrial networks, for example a typical satellite network.

A new PRACH format, including signaling mechanisms for its configuration, with an appropriate length of a preamble and CP and GT may be needed for compatibility with non-terrestrial communication needs, including large round-trip ambiguity. A PRACH format may identify a preamble sequence length, a repetition, a length of CP and GT, and subcarrier spacing. Appropriate length of CP and GT may depend on RTT variation or RTT ambiguity. RTT variation and RTT ambiguity are used interchangeably to refer to the variation in RTT. Preamble sequence repetition and subcarrier spacing may affect coverage. For non-terrestrial networks, depending on the architecture and the type of the non-terrestrial gNodeB or bent pipe, there may be a wide range of RTT ambiguity and also coverage requirements, e.g., based on different noise budgets for the uplink. This wide range of selection may require too many PRACH formats and excessive required signaling in a SIB.

Systems, methods, and devices may be needed to address the impact of non-terrestrial RTT on contention resolution in a contention-based RACH procedure, and/or to address the impact of non-terrestrial RTT on the cross-correlation of PRACH preambles based on Zadoff-Chu (ZC) sequences.

A maximum RTT for a non-terrestrial network may be estimated based on a cell size and a distance of a non-terrestrial gNodeB from the WTRU. After estimating the maximum round-trip time, e.g., from parameters known to the gNodeB, such as the distance from Earth and the minimum angle of elevation, the gNodeB may configure the length of the PRACH response window as "rar-WindowLength" through higher layer signaling, e.g., in a SIB message, with a maximum value of the expected RTT (e.g., 600 ms). In some implementations, such as NR, the step size for the "rar-WindowLength" may be one slot. In some non-terrestrial network implementations, in order to indicate values up to 600 milliseconds with a step size of one slot (e.g., with one millisecond for subcarrier spacing of 15 kHz and smaller for larger subcarrier spacing, at least ten bits are needed.

In some implementations, for a non-terrestrial network, a WTRU may determine the random access response (RAR) window length using a "rar-WindowLength" parameter with an extended length (e.g., "Ext-rar-WindowLength") which may include all possible window length combinations with 1 millisecond step sizes. In some cases, this approach may incur more signaling overhead as compared with terrestrial NR.

In some implementations, a table indicating the length of the PRACH response window may be used for the WTRU to determine the PRACH response window length. In some cases, this approach may incur lower signaling overhead. Table 4 is an example table for indicating the length of the PRACH response window for both terrestrial and non-terrestrial cases. A number of codewords may be assigned for low granularity indications of the RAR window length (e.g., small step sizes, e.g., of 1 millisecond) and a number of codewords may be assigned for high granularity indications of the RAR window length (e.g., large step sizes, e.g., of 10 to 100 milliseconds).

TABLE 4

| Content of "rar-WindowLength" | Length of the random access response window |
| --- | --- |
| 0000 | 0 |
| 0001 | 1 slot |
| 0010 | 2 slots |
| 0011 | 3 slots |
| 0100 | 4 slots |
| 0101 | 5 slots |
| 0110 | 6 slots |
| 0111 | 7 slots |
| 1000 | 8 slots |
| 1001 | 9 slots |
| 1010 | 10 slots |
| 1011 | 20 subframes |

TABLE 4-continued

| Content of "rar-WindowLength" | Length of the random access response window |
| --- | --- |
| 1100 | 50 subframes |
| 1101 | 100 subframes |
| 1110 | 300 subframes |
| 1111 | 600 subframes |

A WTRU may determine the length of the PRACH response window using different tables for mapping "rar-WindowLength", e.g., depending on an explicit or implicit configuration from a SIB. For example, in some implementations, five different tables may be defined for five cases of gNodeB types (e.g., Terrestrial, High Altitude Platform Station (HAPS), low earth orbit (LEO), medium earth orbit (MEO), geostationary (GEO)). In some implementations, two different tables may be defined for terrestrial and non-terrestrial communications. The WTRU may identify each case, e.g., based on the information that it receives from SIB messages. In some implementations, using this approach, the table for "rar-WindowLength" for the case of terrestrial gNodeBs may be the same as the table that is defined in 5G NR release 15. Table 5 is an example table for indicating the length of the PRACH response window (e.g., "rar-WindowLength") for the case of a non-terrestrial gNodeB.

TABLE 5

| Content of "rar-WindowLength" | Length of the random access response window |
| --- | --- |
| 0000 | 1 subframe |
| 0001 | 2 subframes |
| 0010 | 5 subframes |
| 0011 | 10 subframes |
| 0100 | 20 subframes |
| 0101 | 30 subframes |
| 0110 | 40 subframes |
| 0111 | 50 subframes |
| 1000 | 100 subframes |
| 1001 | 200 subframes |
| 1010 | 300 subframes |
| 1011 | 400 subframes |
| 1100 | 500 subframes |
| 1101 | 600 subframes |
| 1110 | 700 subframes |
| 1111 | 800 subframes |

For a non-terrestrial network, variations in the RTT between a WTRU and a non-terrestrial gNodeB may be estimated based on cell size and distance from the non-terrestrial gNodeB to the cell. In some cases of non-terrestrial networks (e.g., GEO, MEO and LEO satellites, but e.g., not necessarily for HAPS), the average RTT may be larger (e.g., much larger) than the variation in RTT.

In some implementations, the length of the PRACH response window may need to be greater than the maximum ambiguity of the RTT, but may not need to be greater than the maximum RTT. A WTRU monitoring a very large time window may unnecessarily use a large amount of power for this purpose in some cases. To reduce such unnecessary power consumption, in some implementations, a time offset that is approximately equal to the minimum RTT may be used, and a mechanism may be employed to inform both a gNodeB and the WTRU regarding this offset.

It is noted that the time offset may need be known to both the gNodeB and the WTRU in some implementations, however, the time offset may not need to be equal to the minimum RTT. In some implementations, if the offset is less than the minimum RTT and the window covers the possible ambiguities in the RTT, the PRACH response mechanism will work properly. In some implementations, the gNodeB and the WTRU is informed of the time offset that is applied for the beginning of the PRACH response window based on a standard specification, implicit signaling, explicit signaling, or a combination of these.

In some implementations, the time offset is implicitly configured by identifying a rough estimate of the minimum RTT based on the gNodeB type (e.g. GEO, MEO, LEO, HAPS). A minimum RTT may be considered for each type of gNodeB and may be specified in a standard specification. A WTRU may obtain the information about the gNodeB type, e.g., from a SIB message or other mechanism. Based on this information and a table (e.g., as defined in a specification), the WTRU may apply the time offset before the default beginning of the PRACH response window (e.g., as defined in NR, release 15). Table 6 is an example table for identifying the time offset, before the beginning of the PRACH response window, based on the gNodeB type. For each satellite type, the minimum RTT for the bent pipe architecture may be twice the minimum RTT for a satellite gNodeB.

TABLE 6

| gNodeB type | Additional time offset |
|---|---|
| terrestrial | 0 |
| HAPS GNodeB | 0 |
| LEO GNodeB (distance to Earth <150 Km ) | 0 |
| LEO GNodeB (150 Km < distance to Earth < 600 Km ) | 1 ms (1 subframe) |
| LEO GNodeB (600 Km < distance to Earth < 2000 Km ) | 4 ms (4 subframes) |
| MEO GNodeB (2000 Km < distance to Earth < 6000 Km) | 12 ms (12 subframes) |
| MEO GNodeB (6000 Km < distance to Earth < 12000 Km ) | 40 ms (40 subframes) |
| MEO GNodeB (12000 Km < distance to Earth < 18000 Km ) | 80 ms (80 subframes) |
| MEO GNodeB (18000 Km < distance to Earth < 24000 Km ) | 120 ms (120 subframes) |
| MEO GNodeB (2400 Km < distance to Earth < 30000 Km ) | 160 ms (160 subframes) |
| MEO GNodeB (3000 Km < distance to Earth) | 200 ms (200 subframes) |
| GEO | 240 ms (240 subframes) |
| GEO (bent pipe) | 480 ms (480 subframes) |

A range of the PRACH response window length that is needed may depend on the residual ambiguity of the RTT for the WTRU, which may include the ambiguity in the distance of the non-terrestrial gNodeB (or bent pipe) from Earth and the elevation angle. Using a table, such as Table 4, the maximum range for the needed PRACH response window length may be approximately 100 milliseconds and the configuration tables may be defined in a standard specification based on this assumption. A table similar to Table 3, but with different entries, may be used for configuration of the length of the PRACH response window for the case of non-terrestrial communications.

Figure 2:
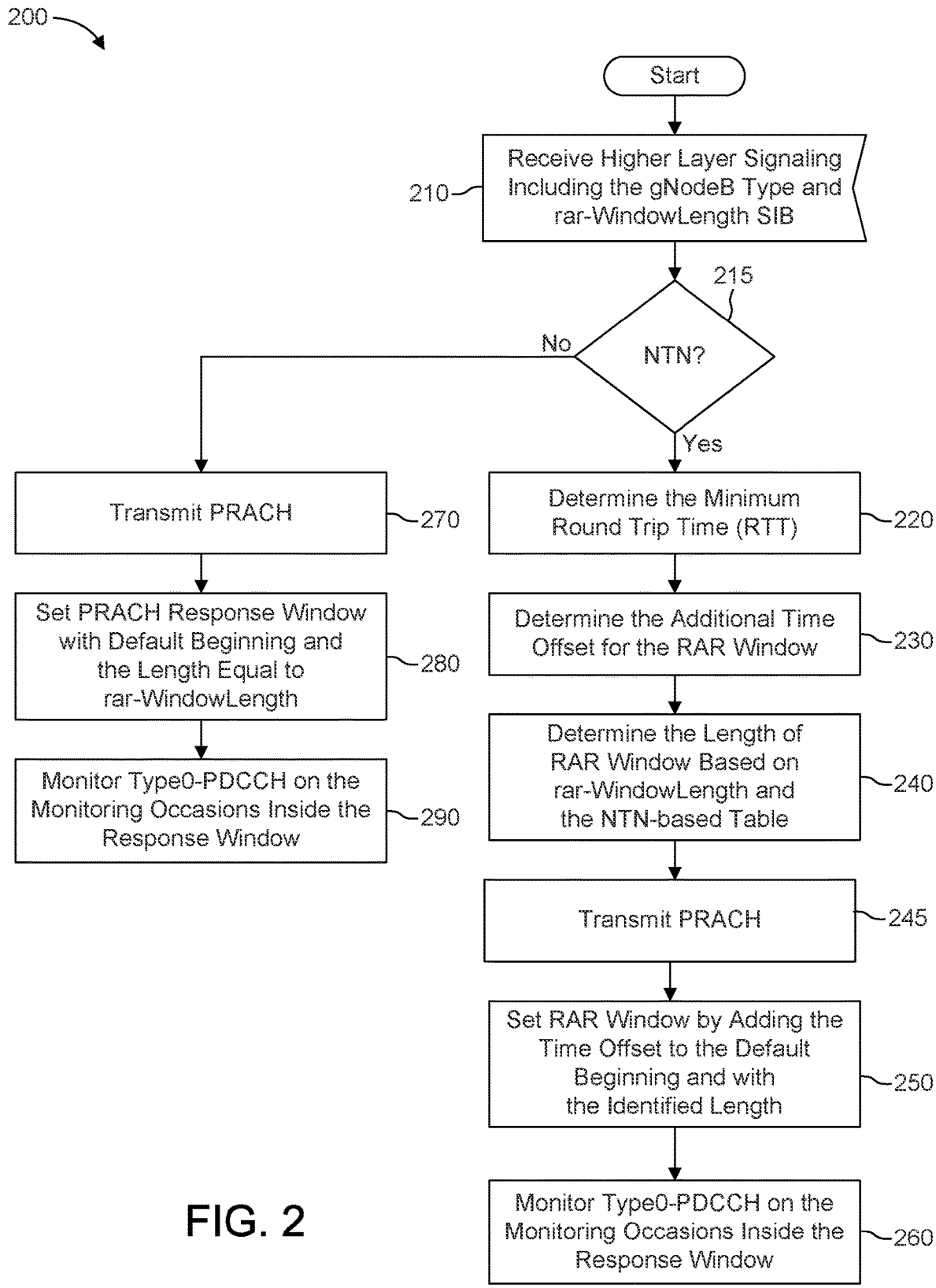
FIG. 2 is a flow chart illustrating an example WTRU procedure for adjusting a random access response window based on an implicitly configured time offset.

FIG. 2 is a flow chart illustrating an example WTRU procedure 200 for adjusting a random access response window based on an implicitly configured time offset. In this example, in element 210, a WTRU receives higher layer signaling including a gNodeB type and a random access response window length (e.g., a "rar-WindowLength" parameter) in a SIB message. The WTRU may determine whether the gNodeB is in a non-terrestrial network.

On a condition 215 that the gNodeB is in a non-terrestrial network, the WTRU may determine a minimum RTT in element 220. The WTRU may determine the time offset for the RAR window in element 230. The WTRU may determine a length of the RAR window based on the "rar-WindowLength" parameter and a non-terrestrial based table in element 240. The WTRU may transmit a PRACH preamble in element 245. The WTRU may set the RAR window, e.g., by adding the time offset to a default beginning and with the identified length in element 250. The WTRU may monitor a downlink control channel (e.g., type-0 PDCCH) on monitoring occasions inside the response window in element 260. It is noted that the various elements of FIG. 4, as in other figures, can be performed in a different order where appropriate. For example, elements 220, 230, and 240 could be performed after transmitting the PRACH preamble of element 245 in some embodiments.

On a condition 215 that the gNodeB is not in a non-terrestrial network, the WTRU may transmit a PRACH preamble in element 270. The WTRU may set the PRACH response window with a default beginning and the length equal to the "rar-WindowLength" parameter in element 280. The WTRU may monitor a type-0 PDCCH on the monitoring occasions inside the response window in element 290.

In some implementations, a time offset for the beginning of the PRACH response window may be adjusted based on explicit signaling, e.g., in a SIB message. For example, a gNodeB, based on its distance to Earth, its footprint, and elevation angle, may estimate the minimum RTT for the WTRUs in its associated footprint. The gNodeB may send an estimate of the minimum RTT to the WTRU s by higher layer signaling, for example in a SIB message. The remaining ambiguity of the RTT is at most equal to a quantization for the signaled minimum RTT plus the maximum round trip variation for the footprint of the satellite beam.

To lower the signaling overhead without sacrificing the quantization resolution, this explicit signaling approach may be combined with the implicit approach. The WTRU may determine a large portion of the minimum RTT based on the non-terrestrial gNodeB (or bent pipe) similar to Table 4. The gNodeB, after estimating the more exact minimum RTT, may signal the remaining part of it to the WTRU by higher layer signaling, for example by deducting the value that is already defined in a specification table and implicitly available to the WTRU.

Figure 3:
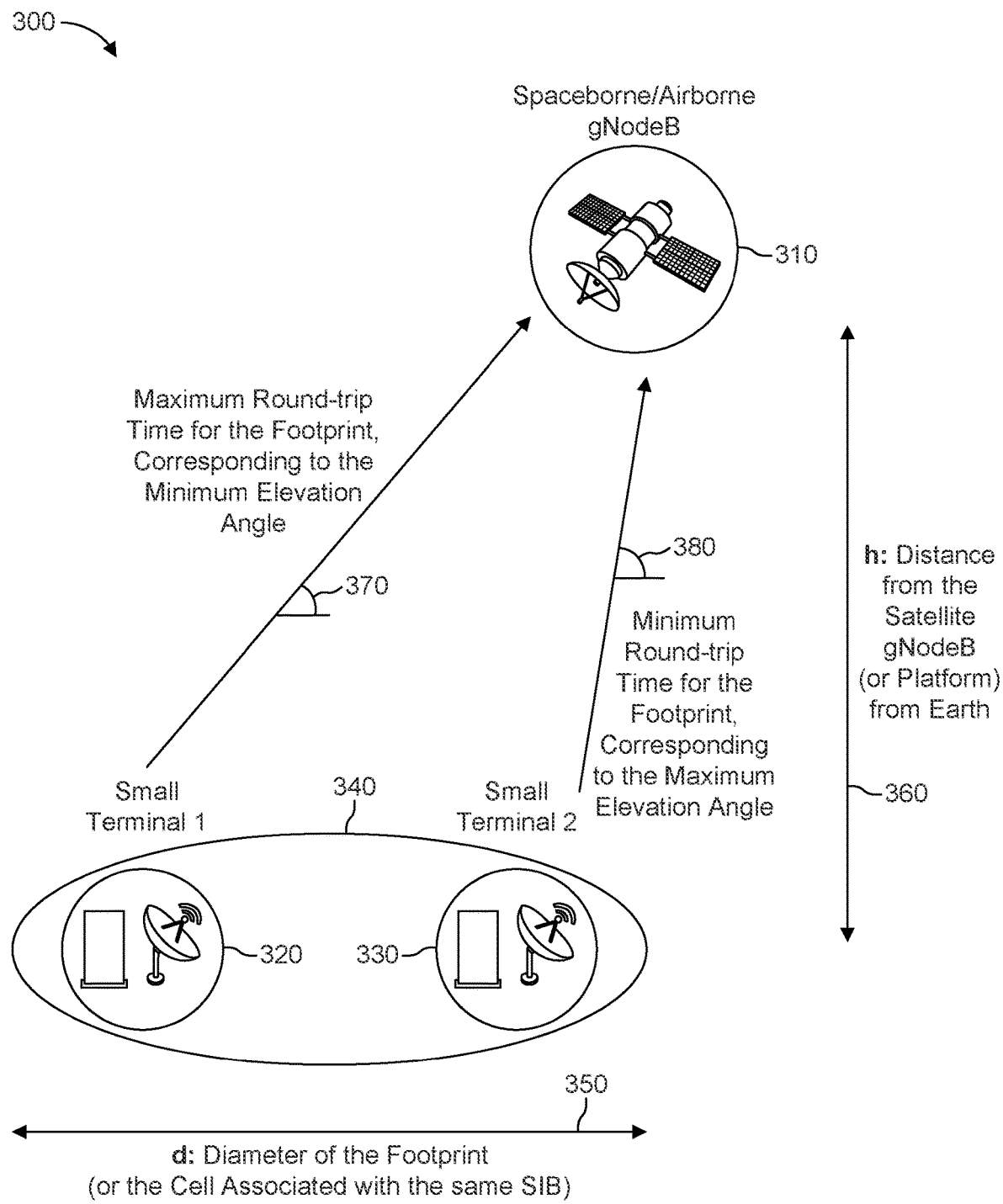
FIG. 3 is a three dimensional view of an example non-terrestrial communications system.

FIG. 3 is a three dimensional view of an example non-terrestrial communications system 300 which includes a non-terrestrial (e.g., spaceborne or airborne) gNB 310, a first WTRU 320, and a second WTRU 330. FIG. 3 illustrates various relationships among these various components, including footprint 340, a diameter 350 of footprint 340, the distance 360 between gNB 310 and the Earth, the maximum elevation angle 370, corresponding to the maximum RTT, and the minimum elevation angle 380, corresponding to the minimum RTT. These relationships also imply the maximum variation of the RTT (i.e., the round-trip time ambiguity).

In some implementations, a WTRU may use a combination of information about the type of non-terrestrial gNodeB, a distance from Earth and the elevation angle (which may be signaled explicitly by the gNodeB or estimated by the WTRU) for a more accurate estimation of the minimum RTT in determining the time offset.

A large number of PRACH formats may be needed for non-terrestrial networks. Some implementations reduce the number of choices (and signaling overhead) by decoupling the choice of CP and GT from the number of repetitions. Some implementations also make the choice (or the choice of one or other of the CP or GT, or a down-selection among the choices for CP and/or GT) based on an implicit deduction from other parameters, rather than only relying on explicit signaling.

Decoupling the round trip aspect of a PRACH format from the coverage aspect may be achieved by informing the WTRU of the selection of repetition via implicit signaling (e.g., separate from the PRACH format). Implicit information about the uplink link budget, e.g., based on the non-terrestrial gNodeB type (i.e. GEO, MEO, LEO, or HAPS) and its reception capability may be used for implicit selection of the preamble length (or the repetition factor). This information may be obtained by a WTRU through a SIB message.

Some implementations include hybrid implicit/explicit signaling of the PRACH format. A PRACH format which indicates the length of CP and GT may depend on the range of RTT ambiguity. Part of this information may be implicitly obtained by a WTRU based on other parameters (e.g., based on the non-terrestrial gNodeB type) rather than all of the information being explicitly signaled by a gNodeB (e.g., where a parameter is sent directly to the WTRU).

A smaller subset of PRACH formats may be used for each type of non-terrestrial gNodeB (or non-terrestrial bent pipe) and for each case, only the selection in that subset may be signaled. In some implementations, the same format names are used for non-terrestrial communications as in terrestrial NR, except with different definitions according to each type of the non-terrestrial gNodeB (or bent pipe), e.g., as specified in a standard.

In some implementations, a different table of PRACH formats may be used for a gNodeB that is on a GEO satellite. The formats used for GEO may cover the variations in RTT for different cases. In some examples, the variation in RTT may be up to 5 milliseconds for the case that the elevation angle is about 40 degrees and the footprint size is about 500 km. Table 7 shows example of PRACH format definitions for the case of a GEO satellite gNodeB.

TABLE 7

| PRACH format | CP length (in ms) | Sequence length (in ms) | Guard Time (in ms) | Number of subframes |
|---|---|---|---|---|
| 0 | 0.103 | 0.8 | 0.097 | 1 |
| 1 | 0.684 | 1.6 | 0.716 | 3 |
| 2 | 3 | 4 | 3 | 10 |
| 3 | 6 | 8 | 6 | 20 |

In Table 7, the selection of the PRACH format may be made by the GEO satellite gNodeB based on its footprint size or cell inside the footprint where the same SIB is used. The approximate maximum variation of RTT may be estimated by the satellite gNodeB based on the following equation:

$$\text{approximate } \Delta RTT < (d^2/h) \cdot \sin\theta + d \cdot \cos\theta \quad \text{Equation 1}$$

where d is the diameter of the cell (where the same SIB is broadcasted in it), h is the distance from the satellite to Earth (or altitude) and $\theta$ is the elevation angle. It is noted that for the GEO satellites, $d \cdot \cos\theta$ becomes the dominant term for lower elevations.

In some implementations (e.g., NR and LTE), for the case of a contention-based RACH procedure, a contention resolution mechanism is used, and a contention resolution timer (e.g., "ra-ContentionResolutionTimer") is used to determine the length of the RACH procedure.

The maximum RTT inherent in non-terrestrial networks may require defining a contention resolution timer with very large durations or modifications in the RACH procedure. As an example, to avoid using very large contention resolution timers (which may make a WTRU unnecessarily busy for a long duration of time and waste energy) time offsets may be used, in a similar way to the discussion above regarding a PRACH response window.

Figure 4:
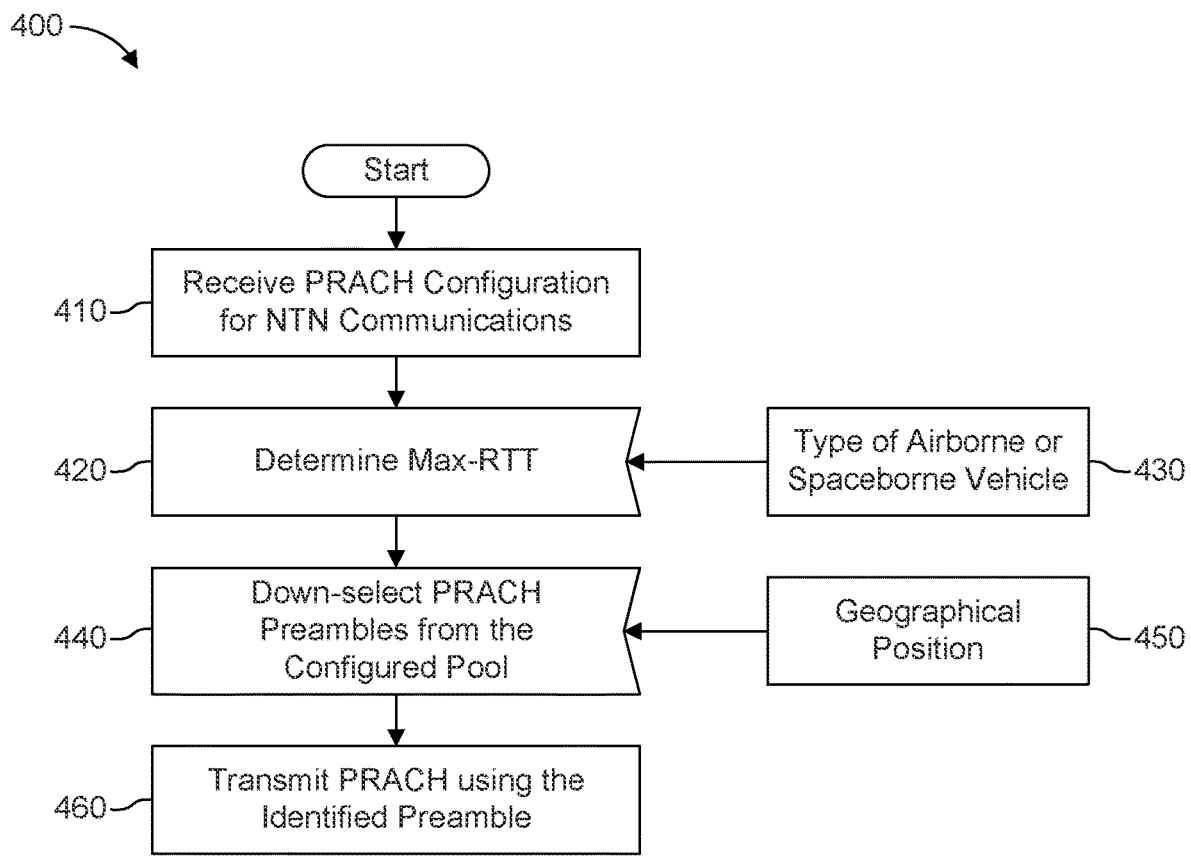
FIG. 4 is a flowchart which illustrates an example WTRU procedure for determining an example PRACH preamble for non-terrestrial communications.

FIG. 4 is a flowchart which illustrates an example WTRU procedure 400 for determining a PRACH preamble for non-terrestrial communications. In order to address the issue of large RTT associated with non-terrestrial networks and its impact on the cross-correlation of the PRACH preambles based on the Zadoff-Chu (ZC) sequences, an adaptive PRACH sequence selection method may be used. In this example, a WTRU may receive a PRACH configuration for non-terrestrial communications in element 410. In response to the PRACH configuration, the WTRU may determine the maximum RTT (max-RTT) in element 420 based on the type of non-terrestrial gNB 430 (i.e., the type of airborne or spaceborne vehicle on which the gNB resides. In some implementations, the WTRU may determine the type of the non-terrestrial gNB (e.g., HAPs or spaceborne satellites (LEO, MEO, GEO), etc.) for transmission implicitly or explicitly through signaling in system information or higher layers, e.g., as discussed earlier.

Based on the estimated RTT, the WTRU may autonomously down-select (i.e., select a subset of) the PRACH preambles from the pool of PRACH preambles configured by the gNodeB in element 440. The WTRU may transmit the PRACH using the identified preamble in element 460.

In the process of down-selecting the PRACH preambles, the WTRU may down-select certain PRACH preambles obtained from cyclic shifts of a given ZC root sequence and/or certain PRACH preambles obtained from different roots. Down-selection of certain PRACH preambles obtained from cyclic shifts of a given ZC root sequence may be needed to ensure that the zero correlation zone of the PRACH preambles is larger than the maximum RTT. In some examples where the RTT is larger than the zero correlation zone of any two PRACH preambles obtained from the cyclic shifts of a given ZC root sequence, the WTRU may choose one cyclic shift per root ZC sequence (e.g., one out of 64 available cyclic shifts per root defined in NR). In such cases, (which may be more relevant to GEO satellites), the pool of PRACH preambles may be limited to different ZC roots (e.g., up to 64 roots). The larger the RTT, the fewer cyclic shifts may be used by the WTRU in a non-terrestrial network, and consequently, a larger number of ZC root sequences may be used for PRACH preambles.

In some implementations, the WTRU may also use the geographical position 450 of the airborne or spaceborne vehicle on which the gNodeB resides, in combination with the RTT, to down-select the PRACH preambles (e.g. root ZC sequences and cyclic shifts of a given root ZC sequence).

A gNodeB that is carried by a MEO/LEO satellite, or a HAPS, is typically fast-moving relative to a terrestrial WTRU. This may cause the WTRU to have a highly variable path-loss. For example, the channel path-loss may change significantly from when a WTRU detects a synchronization signal block (SSB) until the WTRU sends the PRACH preamble. The path-loss may be significantly larger than typical terrestrial networks. Given the power limitation of a WTRU, various approaches may be desired to close the link budget on uplink signals and channels.

A robust PRACH design may be used where a WTRU can cover for the path-loss in a flexible way. In a terrestrial network, the PRACH preamble has a rigid structure with one, two or four repeated parts. However, in a non-terrestrial network, it may be desirable to have more repetitions within the PRACH preamble to cover for the larger path-loss. It may also be desirable to allow more frequent chances for transmission of the PRACH preamble, due to a larger rate of arrival of WTRU s, which may be due to a larger population of WTRU s or fast-moving gNodeBs.

Figure 5:
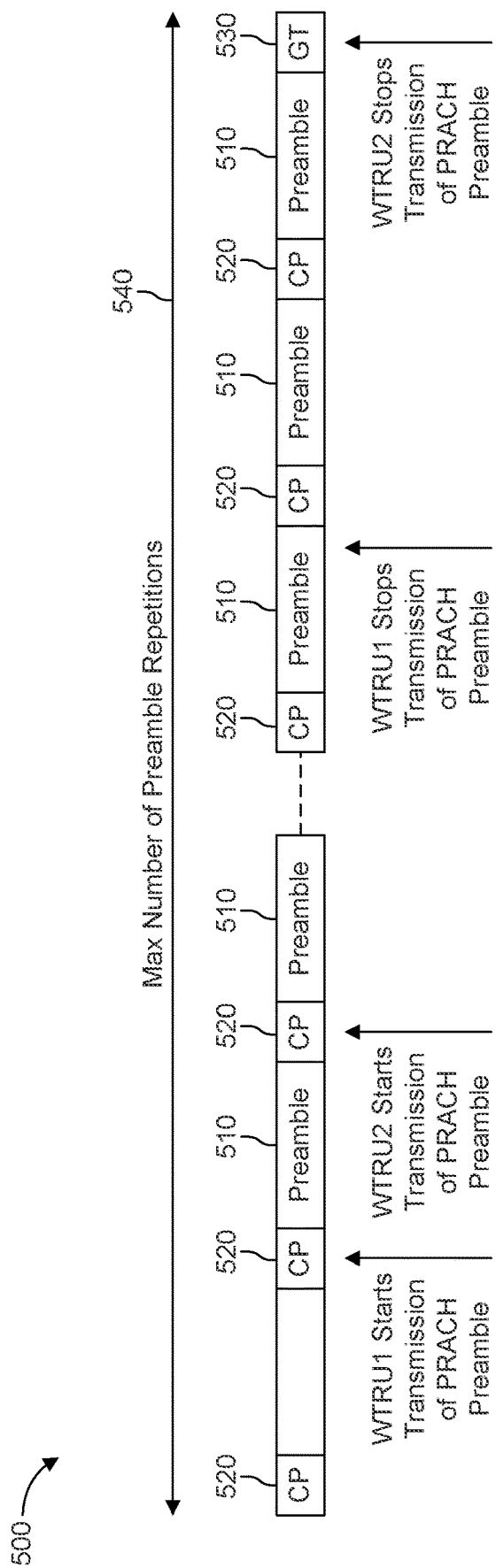
FIG. 5 is a bitmap illustrating an example flexible PRACH preamble structure.

FIG. 5 is a bitmap illustrating an example of a flexible PRACH preamble structure 500. Preamble structure 500 may accommodate a PRACH preamble 510 with a large number of repetitions, cyclic prefixes 520, and a guard time 530. The number of PRACH preamble repetitions may be large, and may be limited by a maximum value 540. The start and end of the PRACH preamble resource, and the maximum number of repeated PRACH preambles, may be obtained by a WTRU from a gNodeB before initiation of a RACH procedure. The long PRACH resource may allow for a variable number of consecutive transmissions of the PRACH preamble by each WTRU.

Figure 6:
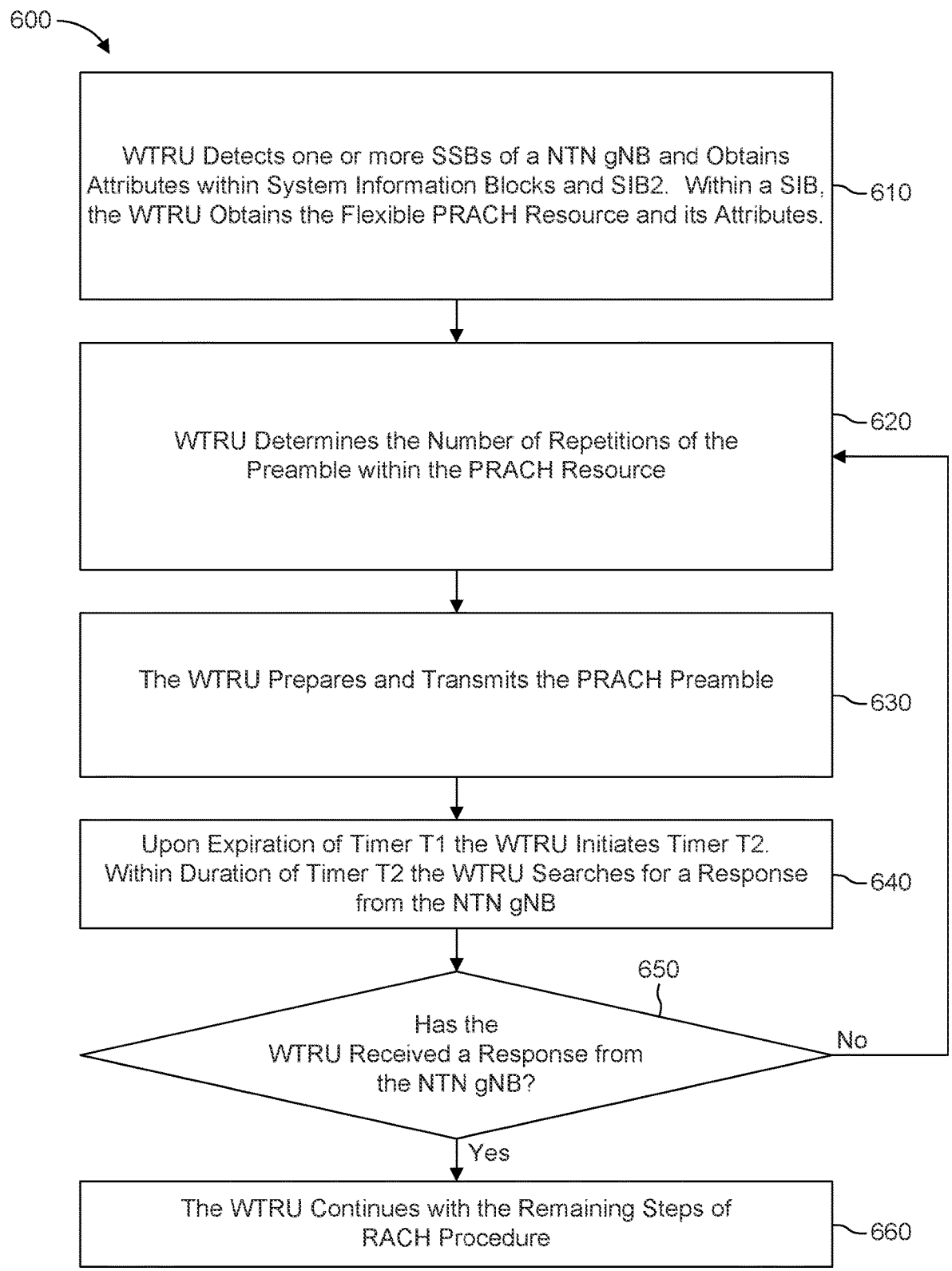
FIG. 6 is a flowchart illustrating example WTRU behavior for a flexible PRACH.

FIG. 6 is a flowchart illustrating an example WTRU behavior 600 for a flexible PRACH. In element 610, the WTRU may detect an SSB of a non-terrestrial (NTN) gNodeB, e.g., of a list of NTN gNodeBs and may obtain PRACH resource attributes (e.g., from a SIB, e.g., SIB2). The attributes may include the start and end of the resource, and the maximum number of preamble repetitions within the resource. The WTRU may also obtain a preamble sequence and a cyclic shift for a SIB.

In element 620, the WTRU may determine the number of repetitions of the preamble within the PRACH resource, e.g., based on factors such as: the number of repetitions in a previous attempt, the estimated path-loss from the last detected SSB or other broadcasted channel, a broadcasted attribute of the gNodeB reception, and an estimate of a direction of movement of the gNodeB (e.g., based on increasing signal strength or decreasing signal strength over the gNodeB).

In element 630, the WTRU may prepare and transmit the preamble starting from any of the repeated blocks within the long-repetition PRACH resource as long as the determined number of repetitions fits the maximum number of preamble repetitions within the resource, and may stop transmitting anywhere before the end of the resource. In some cases, the WTRU may revise the number of repetitions to fit into the available part of the resource and may transmit a variable number of the repeated preambles, as long as it is less than the maximum number of available preamble repetitions within the PRACH resource. The WTRU may try a varying number of repetitions in different attempts to send a Msg1 if earlier attempts is unsuccessful. The WTRU may initiate a first timer (T1).

In element 640, after expiration of T1, the WTRU may initiate a second timer (T2). Within the duration of T2, the WTRU may search for a response from the gNodeB. On a condition 650 that the WTRU receives a response, the WTRU may continue with the remaining parts of the RACH procedure. Otherwise, the procedure returns to element 620.

A gNodeB may run a parallel PRACH detector, for each sequence and each cyclic shift, along the long-repetition PRACH resource and may add the appropriate detection metrics for each preamble and cyclic shifts along the PRACH resource. The gNodeB may stop detection of a given sequence and given cyclic shift if the accumulated metric for it passes a threshold and if other attributes, such as time advance, are determined with enough confidence.

Figure 7:
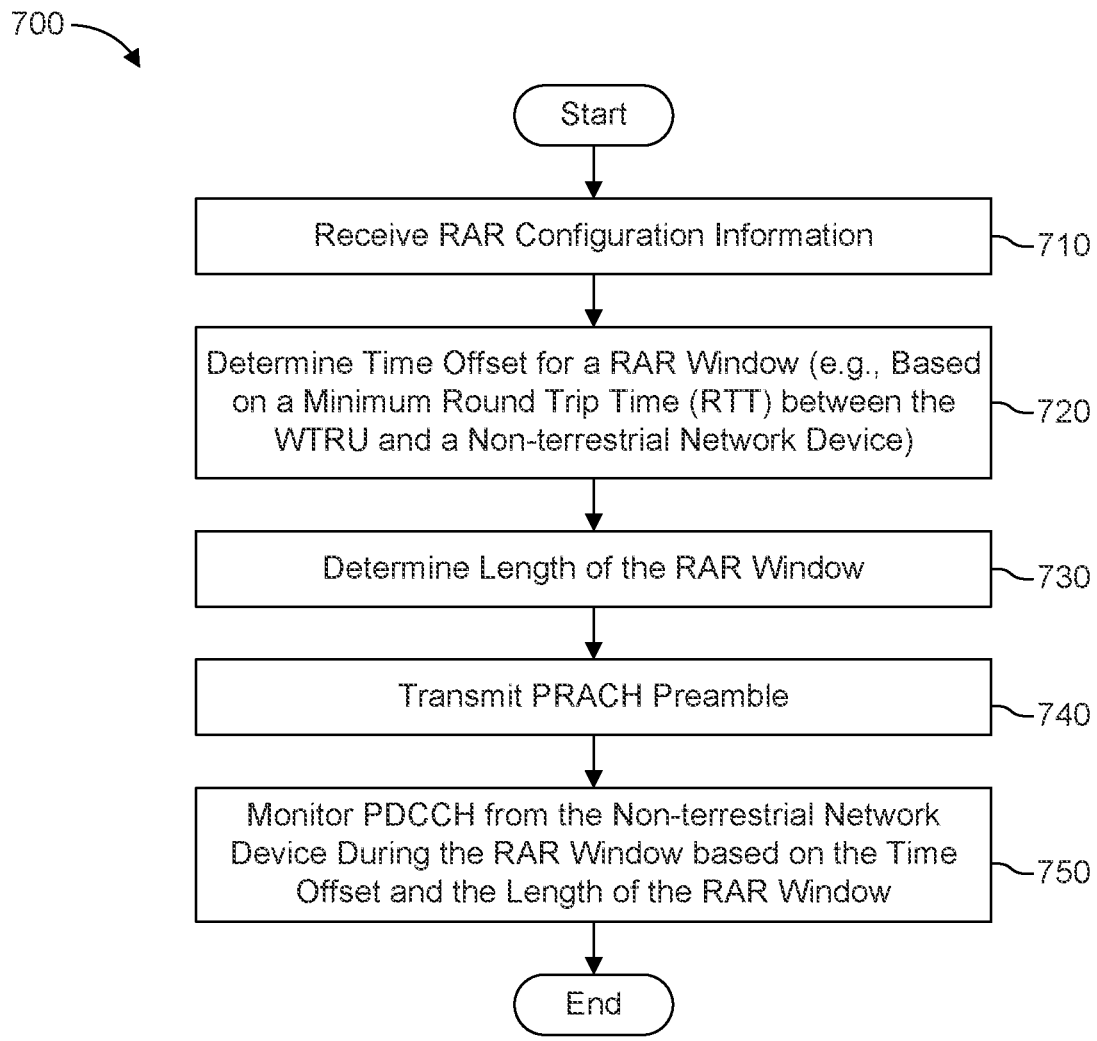
FIG. 7 is a flow chart illustrating an example method for random access to a communications network by a WTRU.

FIG. 7 is a flow chart illustrating an example method 700 for random access to a communications network by a WTRU. Method 700 is exemplary, and can be implemented using any suitable WTRU, e.g., as discussed herein, and can be used in conjunction with any of the techniques discussed herein.

In element 710, the WTRU receives random access response (RAR) configuration information. In element 720, the WTRU determines a time offset for a RAR window, based on a minimum round trip time (RTT) between the WTRU and a non-terrestrial network device. In element 730, the WTRU determines a length of the RAR window. In element 740, the WTRU transmits a PRACH preamble to the non-terrestrial network device. In element 750, the WTRU monitors a physical downlink control channel (PDCCH) from the non-terrestrial network device during the RAR window based on the time offset and the length of the RAR window. It is noted that the various elements of FIG. 7, as in other figures, can be performed in a different order where appropriate. For example, elements 710, 720, 730 could be performed after transmitting the PRACH preamble of element 740 in some embodiments.

Figure 8:
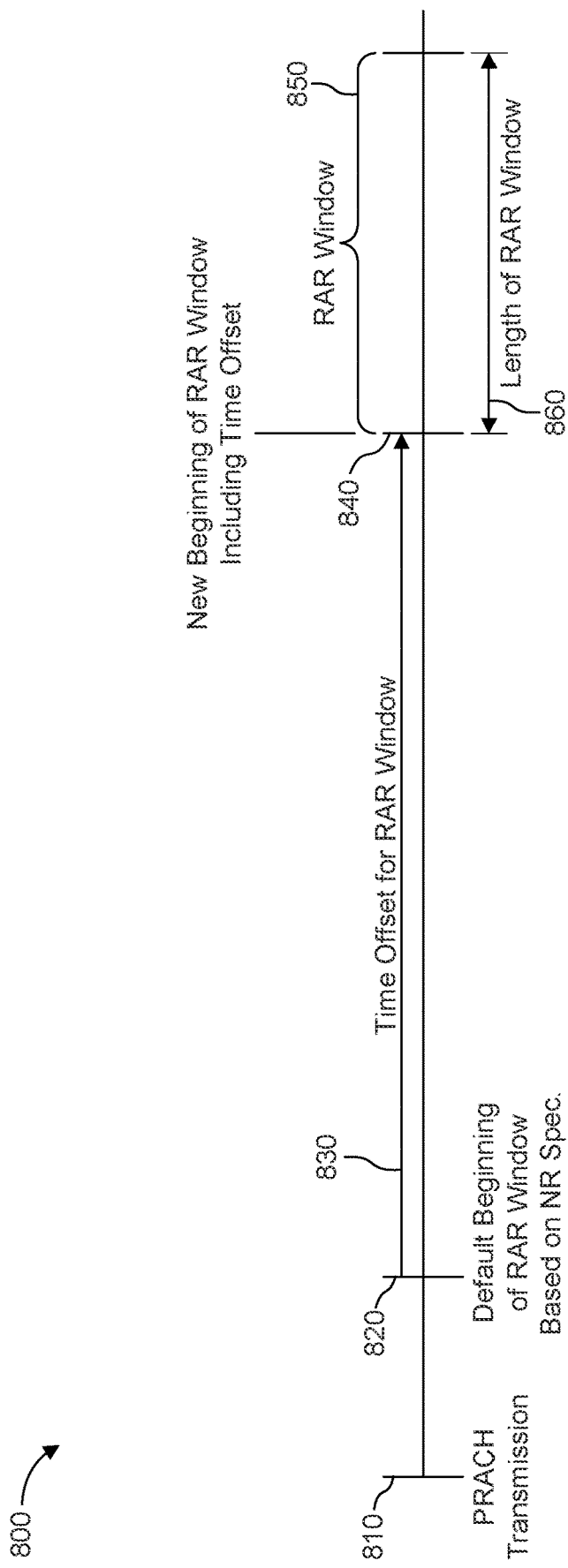
FIG. 8 is a timeline illustrating example RACH timing for NTN applications.

FIG. 8 is a timeline 800 illustrating example RACH timing for NTN applications. Timeline 800 illustrates example PRACH communications between a WTRU and an non-terrestrial gNB, which is usable with various devices and techniques discussed herein. For example, the example communications of timeline 800 could represent communications between first WTRU 320 and gNB 310 as shown and described with respect to FIG. 3. In timeline 800, the WTRU transmits a PRACH preamble at time 810. In a terrestrial network, or by default (for example, according to present NR specifications), the WTRU would begin attempting to detect a RAR response (e.g., from a gNB) to the PRACH preamble at default RAR window start time 820. In this example however, time offset 830 is added to start time 820 to yield a NTN RAR window start time 840. Time offset 830 is calculated, e.g., as discussed herein, to compensate for the minimum RTT (e.g., corresponding to elevation angle 380) between the WTRU and the non-terrestrial gNB. The WTRU continues to attempt to detect the RAR response during RAR window 850. The length 860 of RAR window 850 is calculated, e.g., as discussed herein, based on the difference between the minimum RTT (e.g., corresponding to elevation angle 380) and the maximum RTT (e.g., corresponding to elevation angle 370) between the WTRU and the non-terrestrial gNB.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a wireless transmit/receive unit (WTRU), the method comprising:
   receiving, by the WTRU, random access response (RAR) configuration information;
   receiving, by the WTRU, a distance and an elevation angle of a non-terrestrial network device;
   transmitting, by the WTRU, a physical random access channel (PRACH) preamble transmission to the non-terrestrial network device; and
   receiving, by the WTRU, a physical downlink control channel (PDCCH) transmission from the non-terrestrial network device during a RAR time window, wherein a beginning of the RAR time window is based on a time offset, and wherein the time offset is based on the distance and the elevation angle.

2. The method of claim 1, wherein a length of the RAR time window is based on the distance and the elevation angle.

3. The method of claim 1, wherein the time offset is based on a minimum round trip time (RTT) between the WTRU and the non-terrestrial network device, and wherein the minimum RTT is based on the distance and the elevation angle.

4. The method of claim 1, wherein the WTRU receives the RAR configuration information in a system information block (SIB).

5. The method of claim 1, wherein the WTRU receives information indicating a minimum round trip time (RTT) between the WTRU and the non-terrestrial network device in the configuration information.

6. The method of claim 1, wherein a length of the RAR time window is based on a maximum variability of a round trip time (RTT) between the WTRU and the non-terrestrial network device.

7. The method of claim 1, wherein a maximum variability of a round trip time (RTT) between the WTRU and the non-terrestrial network device is based on the distance and the elevation angle.

8. The method of claim 1, wherein the non-terrestrial network device comprises a gNodeB.

9. The method of claim 1, wherein the non-terrestrial network device comprises a satellite or an aircraft.

10. The method of claim 1, wherein the non-terrestrial network device comprises a low earth orbit (LEO) satellite, medium earth orbit (MEO) satellite, geostationary orbit (GEO) satellite, or a high altitude platform station (HAPS).

11. A wireless transmit/receive unit (WTRU) comprising:
    receiver circuitry configured to receive random access response (RAR) configuration information;
    the receiver circuitry further configured to receive a distance and an elevation angle of a non-terrestrial network device; transmitter circuitry configured to transmit a physical random access channel (PRACH) preamble transmission to the non-terrestrial network device; and
    the receiver circuitry further configured to receive a physical downlink control channel (PDCCH) transmission from the non-terrestrial network device during a RAR time window, wherein a beginning of the RAR time window is based on a time offset, and wherein the time offset is based on the distance and the elevation angle.

12. The WTRU of claim 11, wherein a length of the RAR time window is based on the distance and the elevation angle.

13. The WTRU of claim 11, wherein the time offset is based on a minimum round trip time (RTT) between the WTRU and the non-terrestrial network device, and wherein the minimum RTT is based on the distance and the elevation angle.

14. The WTRU of claim 11, wherein the receiver circuitry is further configured to receive the RAR configuration information in a system information block (SIB).

15. The WTRU of claim 11, wherein the receiver circuitry is further configured to receive information indicating a minimum round trip time (RTT) between the WTRU and the non-terrestrial network device in the configuration information.

16. The WTRU of claim 11, wherein a length of the RAR time window is based on a maximum variability of a round trip time (RTT) between the WTRU and the non-terrestrial network device.

17. The WTRU of claim 11, wherein a maximum variability of a round trip time (RTT) between the WTRU and the non-terrestrial network device is based on the distance and the elevation angle.

18. The WTRU of claim 11, wherein the non-terrestrial network device comprises a gNodeB.

19. The WTRU of claim 11, wherein the non-terrestrial network device comprises a satellite or an aircraft.

20. The WTRU of claim 11, wherein the non-terrestrial network device comprises a low earth orbit (LEO) satellite, medium earth orbit (MEO) satellite, geostationary orbit (GEO) satellite, or a high altitude platform station (HAPS).

* * * * *